United States Patent [19]
Ando

[11] 3,946,160
[45] Mar. 23, 1976

[54] TELEPHONE ANSWERING DEVICE WITH PLURAL MESSAGE RECORDING TAPES

[75] Inventor: Shizuo Ando, Saitama, Japan

[73] Assignee: Pioneer Electronic Corporation, Tokyo, Japan

[22] Filed: Feb. 19, 1975

[21] Appl. No.: 551,227

[30] Foreign Application Priority Data
Feb. 19, 1974 Japan............................. 49-19678

[52] U.S. Cl................................. 179/6 R; 360/91
[51] Int. Cl.² ................... G11B 15/06; H04M 1/64
[58] Field of Search...... 179/6 R, 100.4 PT; 360/91, 360/92, 96, 63

[56] References Cited
UNITED STATES PATENTS 3,845,248   10/1974   Ando ................................. 179/6 R
3,898,385   8/1975   Shimomiti et al.................. 179/6 R

*Primary Examiner*—Vincent P. Canney
*Attorney, Agent, or Firm*—Sughrue, Rothwell, Mion, Zinn & Macpeak

[57] ABSTRACT

The speed of either the feed reel or the take-up reel of a tape cassette is detected as an indication of the amount of recording time left on the message recording tape. When about five minutes or less of recording time is left, and when no incoming messages are being received over the telephone line, a control circuit switches the recording operation over to another available cassette.

3 Claims, 2 Drawing Figures

TELEPHONE ANSWERING DEVICE WITH PLURAL MESSAGE RECORDING TAPES

BACKGROUND OF THE INVENTION

1. Field of the Invention

This invention relates generally to an automatic telephone-answering and message-recording apparatus capable of maintaining a calling state in response to a calling signal coming over a telephone line, transmitting previously recorded answer messages over the telephone line, and recording incoming messages received over the telephone line, and, more particularly, to such an apparatus for automatically switching from a first track to another on a multi-track message recording tape or for switching from a first independent message recording tape to another, when the first recording medium has run to a position near the end thereof.

2. Description of the Prior Art

As the tape (or recording time) used for a telephone-answering apparatus is limited in length, a plurality of recording sections for recording incoming messages on tracks or separated tapes must be provided and must be operated sequentially in order to record a large volume of incoming messages. Moreover, it is desirable to control each recording section so that the next recording section may be operated for the first time when the tape in the first recording section has reached a predetermined position near its end and when the incoming messages have ended after the predetermined position has been reached.

SUMMARY OF THE INVENTION

The present invention provides an improved automatic telephone-answering apparatus which reliably achieves switchover from one recording medium to another as a function of the rotational speed of either the tape supply reel or the tape take-up reel.

DETAILED DESCRIPTION OF THE PREFERRED EMBODIMENT

Figure 1:
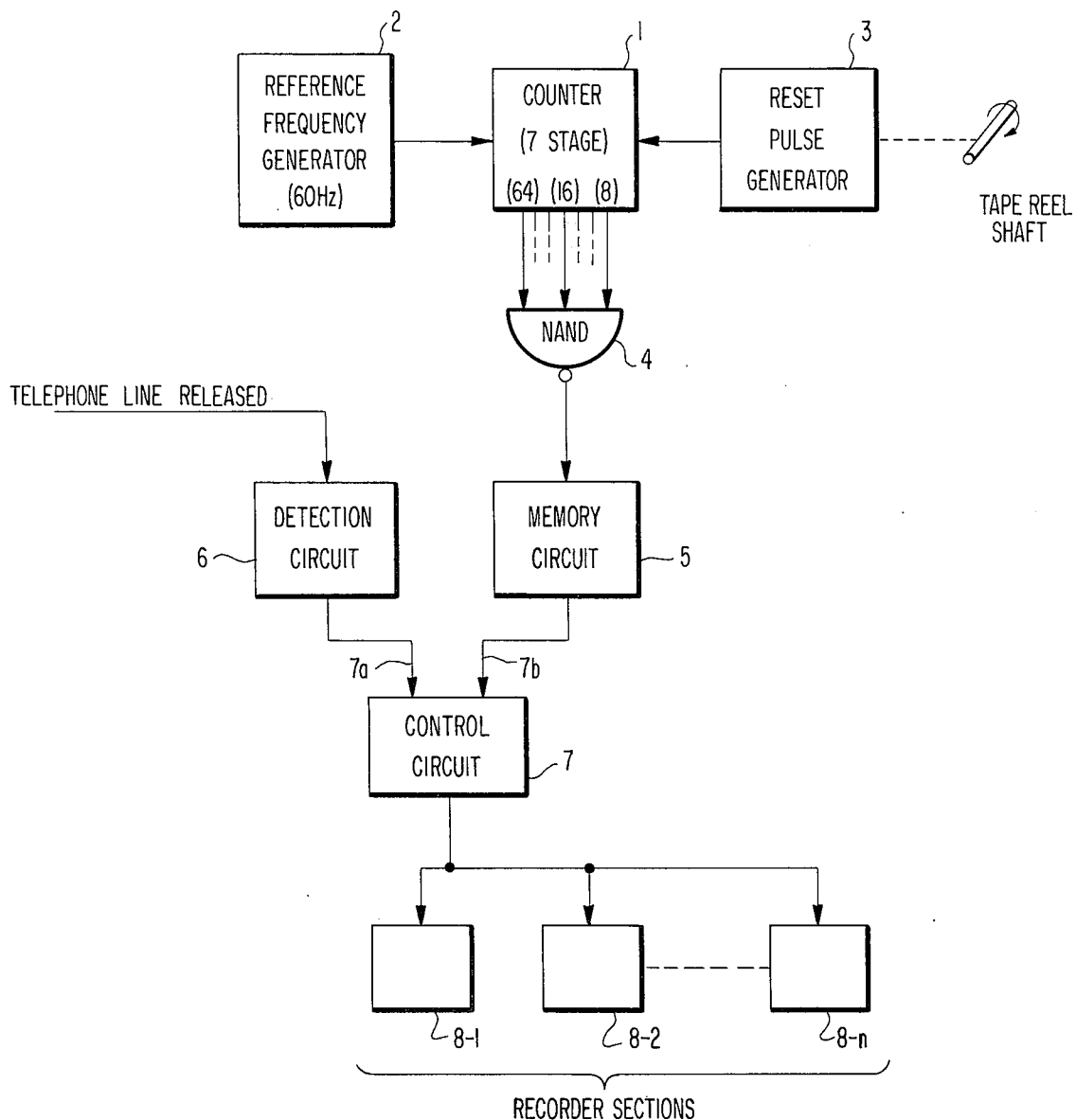
FIG. 1 is a block diagram of a part of an automatic telephone-answering apparatus in accordance with a preferred enbodiment of the invention.

A preferred embodiment of the present invention which is available for the apparatus shown in copending application Ser. No. 367,929 will be explained with reference to the accompanying drawing. In the device of FIG. 1, a counter 1 is provided for counting the pulses supplied by a reference frequency generator 2 which provides a train of clock pulses with a constant repetition cycle. The count stored in the counter is cleared whenever a reset pulse is applied thereto by a reset-pulse generator 3, as shown in U.S. Pat. Nos. 3,779,483 or 3,730,453, which generates reset pulses in a cycle proportional to the reel shaft rotation speed on either the feeding or winding side of the message recording tape. If the reset-pulse generator 3 generates reset pulses in a cycle propotional to the feeding reel shaft rotation speed, the interval between reset pulses is long at the beginning of the tape feeding, but it becomes short as the tape approaches the end of the feeding. Thus, the number stored in the counter 1 just before it is cleared will be smaller near the end of tape feeding than near its beginning.

More specifically, the counter 1 counts 88 during a period of about 1.47 seconds which is the time required for the feeding reel shaft to make one complete rotation at the point when the tape is 5 minutes from its end, provided the frequency of the signal generated by the reference frequency generator 2 is 60 Hz which is the frequency of the power source and the cassette tape used is a "C-90," i.e., a 90-minute tape. The counter 1 indicates its counted number with a binary code appearing on seven output terminals. When the counter counts up to 88 (i.e., 64 + 16 + 8), it produces mark signals on three specific counter output terminals corresponding to 88. This condition is detected by a NAND gate 4 and stored in a memory circuit 5. If the cassette tape used is "C-60," the time or period required for the reel shaft to make one rotation at the 5 minute point is about 1.87 sec., and the corresponding counted number for this period is 112; thus, counter 1 would provide mark signals on the specific terminals corresponding to 112; i.e., 64 + 32 + 16.

On the other hand, when incoming messages from the telephone line cease or a predetermined operation time period passes, so that the line and answering apparatus are released from the calling state, a detection circuit 6 as shown in U.S. Pat. No. 3,688,043 gives an output signal. This signal is fed to one input 7a of a control circuit 7 having another input 7b connected to the output of memory circuit 5. The control circuit 7 operates when it receives both the output (indicative of a count of 88, for example) of the memory circuit 5 and that of the detection circuit 6. The control circuit already then stops the operation of the first recorder section 8-1 and simultaneously brings state capable of driving the second recorder section 8-2 to the apparatus. This operation is repeated until the last recorder section 8-n stops.

If each of the recorder sections 8-1 to 8-n is assigned to an independent recording tape, the scanning of recorder section 8-1 to 8-n may be done in such a way as to skip any unavailable recorder (e.g., a recorder which is in a playback operation, or one which does not have a tape placed in position ready for recording). Thus, the switch-over from one recorder section to another takes place only when the control circuit 7 detects the absence of an incoming message coincidentally with the condition that the recording time remaining on the tape is less than a predetermined value (e.g., about 5 min). Consequently, switch-over of recorder sections 8-1 to 8-n does not occur when an incoming message is being received over the telephone line, and hence, any inconvenience, e.g., loss of a part of an incoming message, does not occur.

Figure 2:
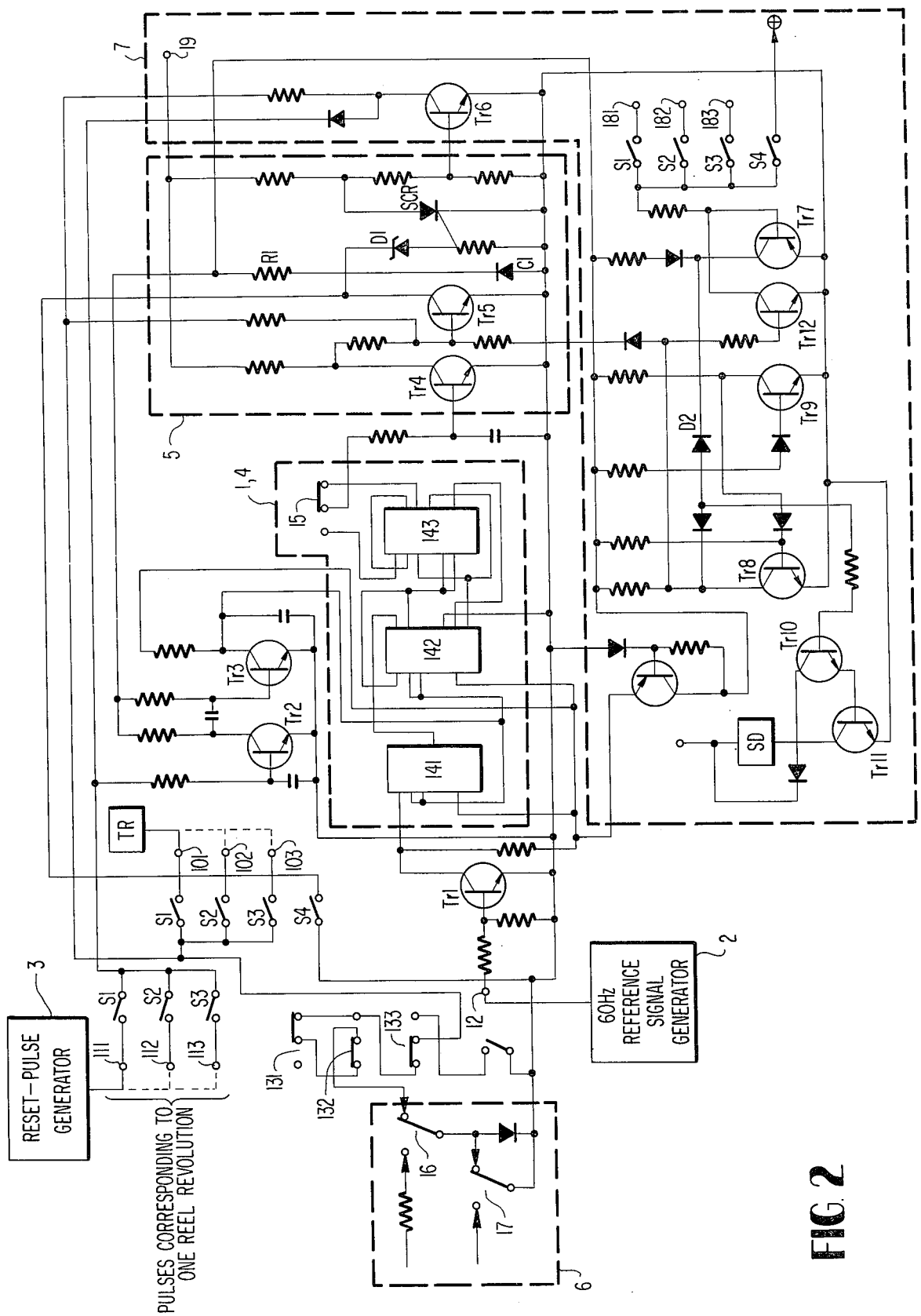
FIG. 2 is a schematic diagram of a preferred electric circuit forming the important part of the apparatus illustrated in FIG. 1.

FIG. 2 shows a specific circuit construction of the main part of the present automatic telephone-answering apparatus. Three independent recording tapes (not shown) are assumed to be available for recording incoming or calling messages. A tape recorder TR comprising motor, a solenoid, and other mechanisms for playing back each tape are connected between a power source and terminals 101, 102 and 103. The pulses corresponding in number to the period of one reel shaft rotation are fed to terminals 111, 112 and 113, respectively. A reference signal with a constant frequency is supplied to terminal 12. Switches 131, 132 and 133 are for selecting a function mode of the apparatus and stay at their positions shown in FIG. 2 while the apparatus is in automatic answering operation.

The reference signal supplied to a terminal 12 is amplified by an amplifier consisting of transistor Tr1 before it is fed to an input of counter comprising three integrated circuits 141, 142 and 143 where the reference frequency is counted. On the other hand, a pulse supplied to one of terminals 111, 112 and 113 is fed through a wave shaper circuit consisting of transistors Tr2 and Tr3 and applied as a reset pulse to another input of the counter. Therefore, every time a reset pulse is fed to the latter input, the counter resets. When the counted number reaches a predetermined value (e.g., 88), the output level of the counter becomes low and turns OFF transistor Tr4 coupled through a tape selector switch 15 to the output of the counter. As the pulse width fed to terminals 111 to 113 becomes narrower as the length of remaining tape decreases, the counter will eventually be reset before the counted number reaches the predetermined value. Under this condition, the transistor Tr4 remains in its ON state and transistor Tr5 turns OFF, thereby preventing capacitor C1 from discharging. This condition continues for a period determined by the time constant formed by resistance R1 and capacitor C1, and accordingly, when the voltage across capacitor C1 reaches the zener voltage of a zener diode D1, a trigger current flows to the gate electrode of a thyristor SCR. The current turns ON the thyristor SCR, and thereby the transistor Tr6 turns OFF, but the collector voltage thereof will not rise because the collector is grounded through switches 131 to 133 and relay contacts 16 and 17 controled by the detection circuit 6. The time constant circuit consisting of the resistor R1 and the capacitor C1 serves to prevent an erroneous operation by providing a delay time until the transistor Tr6 turns OFF due to a low level output from the counter. The delay time is established to be around 10 seconds. Under the condition described hereinbefore, the feeding reel shaft of a "C-90" cassette makes about seven rotations every 10 seconds when 5 minutes of recording tape remains. If the counter output level remains low during that 10 second delay, then the tape length left for message recording will be less than a given length. The tape selector switch 15 is provided for changing the number to be counted by the counter for the variation in the number of reel shaft rotations due to the thickness of tapes to be used, e.g., C-60 and C-90. If the incoming message ceases or the predetermined time period passes and relay contact 17 is switched to the opposite side while the transistor Tr6 is in the OFF state, the collector voltage of the transistor Tr6 rises and appears on one of the terminals 111, 112 and 113, where it is used for actuating a switch element (not shown) to drop the voltage at one of the terminals 181 to 183. Switches S1 to S4 are controlled by the solenoid SD in such a way as to close one of them at a time. The thyristor SCR is turned OFF only when the positive potential at terminal 19 is removed in the middle of a recording operation. When any one of terminals 181 to 183 is placed at zero potential, transistor Tr7 is OFF and its collector voltage is raised, and hence the diode D2 is reversely biased. Therefore, transistor Tr8 is turned OFF, and a transistor Tr9 is turned ON; thus, the multivibrator consisting of these two transistors starts to oscillate. The output of the multivibrator drives transistors Tr10 and Tr11 to turn ON and OFF periodically and actuate the solenoid SD. The multivibrator also delivers it output to transistor Tr12 to keep the transistor Tr7 OFF.

If the solenoid SD is operated under the condition that switch S1 is being closed, solenoid SD opens the switch S1 and closes the next switch S2. If the second tape is ready for recording, a positive voltage is applied to corresponding terminal 182. This voltage is fed through closed switch S2 to the base of the transistor Tr7. The base bias voltage caused by this positive voltage turns ON the transitor Tr7. The multivibrator stops oscillating and releases the solenoid, thereby the apparatus is brought to the state capable of recording newly coming messages. However, if the second tape is unable to operate, the transistor Tr7 remains OFF because of the low voltage at the terminal 182. At that time, the solenoid SD operates in similar sequence to that described above, and opens the switch S2 and closes the next switch S3. This serarching or hunting operation proceeds automatically, and available tapes are found and used for message recording. When the switch S4 is closed, the base of the transistor Tr7 is biased to turn ON and that condition is maintained, so that the hunting operation stops.

As described above, the apparatus according to the present invention reliably produces and detects a signal indicating that the tape has approached a certain distance from its end, and starts a new independent tape or a new track only when the incoming messages cease later than the detection of the signal. Therefore, an inconvenience, such as a part of a message being lost, does not occur.

I claim:

1. An automatic telephone-answering and message-recording apparatus adapted to be connected to a telephone line and comprising:
    a plurality of recording tape media selectively connectable to the telephone line for recording incoming messages received over the telephone line, each tape medium being fed from a supply reel to a take-up reel during a recording operation;
    reference signal generator means for generating a reference signal having a constant frequency;
    counter means coupled to said generator means for counting the cycles of said reference signal;
    reset pulse generator means for generating reset pulses for said counter means at intervals proportional to the rotational speed of one of the reels during a recording operation;
    detector means coupled to said telephone line for producing a release signal upon the cessation of incoming messages being recorded or the pass of predetermined operation time period during a recording operation on a first of said recording media; and
    control means connected to said plurality of recording tape media, and responsive to a coincidence of said release signal and a predetermined count in said counter means, for switching subsequent incoming messages from said first recording medium to a second of said recording media.

2. An apparatus as defined in claim 1, further comprising memory means coupled between said counter means and said control means for storing an indication of said predetermined count in said counter menas.

3. An apparatus as defined in claim 1, further comprising switch means connected between said counter means and said memory means for selecting said predetermined count to be proportional to a reel speed corresponding to predetermined amount of recording time remaining in said first tape medium.

* * * * *